United States Patent
Perera et al.

(10) Patent No.: US 11,676,043 B2
(45) Date of Patent: Jun. 13, 2023

(54) OPTIMIZING HIERARCHICAL CLASSIFICATION WITH ADAPTIVE NODE COLLAPSES

(71) Applicant: International Business Machines Corporation, Armonk, NY (US)

(72) Inventors: Pathirage Dinindu Sujan Udayanga Perera, San Jose, CA (US); Orna Raz, Haifa (IL); Ramani Routray, San Jose, CA (US); Vivek Krishnamurthy, San Jose, CA (US); Sheng Hua Bao, San Jose, CA (US); Eitan D. Farchi, Pardes Hanna-Karkur (IL)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 16/291,263

(22) Filed: Mar. 4, 2019

(65) Prior Publication Data
US 2020/0285943 A1    Sep. 10, 2020

(51) Int. Cl.
*G06N 3/08*    (2023.01)
*G06N 3/047*    (2023.01)
(Continued)

(52) U.S. Cl.
CPC .......... *G06N 5/022* (2013.01); *G06F 16/9027* (2019.01); *G06F 18/24323* (2023.01);
(Continued)

(58) Field of Classification Search
CPC ....... G06N 3/0472; G06N 3/0481; G06N 3/08
See application file for complete search history.

(56) References Cited

U.S. PATENT DOCUMENTS 5,634,087 A  *  5/1997  Mammone ........... G06K 9/6282
                                                706/41
6,233,575 B1    5/2001  Agrawal et al.
(Continued)

FOREIGN PATENT DOCUMENTS

WO    WO 2017/147396 A1    8/2017

OTHER PUBLICATIONS

Berrada et al. (Smooth Loss Functions for Deep Top-K Classification, Feb. 2018, pp. 1-25) (Year: 2018).*
(Continued)

*Primary Examiner* — George Giroux
(74) *Attorney, Agent, or Firm* — Stephen J. Walder, Jr.; Aaron Pontikos

(57) ABSTRACT

A mechanism is provided in a data processing system having a processor and a memory. The memory comprises instructions which are executed by the processor to cause the processor to implement a training system for finding an optimal surface for hierarchical classification task on an ontology. The training system receives a training data set and a hierarchical classification ontology data structure. The training system generates a neural network architecture based on the training data set and the hierarchical classification ontology data structure. The neural network architecture comprises an indicative layer, a parent tier (PT) output and a lower leaf tier (LLT) output. The training system trains the neural network architecture to classify the training data set to leaf nodes at the LLT output and parent nodes at the PT output. The indicative layer in the neural network architecture determines a surface that passes through each path from a root to a leaf node in the hierarchical ontology data structure. The training system trains a classifier model for a cognitive system using the surface and the training data set.

25 Claims, 9 Drawing Sheets

(51) Int. Cl.
| | |
|---|---|
| *G06N 3/048* | (2023.01) |
| *G06N 5/022* | (2023.01) |
| *G06F 16/901* | (2019.01) |
| *G06F 18/243* | (2023.01) |
| *G06V 10/82* | (2022.01) |
| *G06V 10/44* | (2022.01) |

(52) U.S. Cl.
CPC ............ *G06N 3/047* (2023.01); *G06N 3/048* (2023.01); *G06N 3/08* (2013.01); *G06V 10/454* (2022.01); *G06V 10/82* (2022.01)

(56) References Cited

U.S. PATENT DOCUMENTS

| | | | |
|---|---|---|---|
| 8,768,944 | B2 | 7/2014 | Yoshii et al. |
| 9,367,425 | B1 | 6/2016 | Hale |
| 9,529,836 | B1 | 12/2016 | Hale |
| 9,547,478 | B1 | 1/2017 | Hale |
| 2001/0037324 | A1 | 11/2001 | Agrawal et al. |
| 2008/0091408 | A1 | 4/2008 | Roulland et al. |
| 2012/0004893 | A1 | 1/2012 | Vaidyanathan et al. |
| 2013/0144593 | A1 | 6/2013 | Och et al. |
| 2014/0343965 | A1 | 11/2014 | Miyoshi et al. |
| 2016/0162456 | A1 | 6/2016 | Munro et al. |
| 2016/0239857 | A1* | 8/2016 | Milton ............... G06Q 30/0201 |
| 2017/0213127 | A1* | 7/2017 | Duncan ................ G16B 50/30 |
| 2017/0249387 | A1 | 8/2017 | Hatami-Hanza |
| 2018/0121601 | A1* | 5/2018 | Hahm ..................... G16B 30/10 |
| 2019/0102646 | A1* | 4/2019 | Redmon ................ G06V 20/20 |
| 2019/0102667 | A1* | 4/2019 | Bashkirov ............. G06N 3/004 |

OTHER PUBLICATIONS

List of IBM Patents or Patent Applications Treated as Related, Jun. 6, 2019, 2 Pages.
Anonymously, "Intelligent Ordering of Repeated Fields", IP.com No. IPCOM000252100D, IP.com Electronic Publication Date: Dec. 15, 2017, 35 pages.
Anonymously, "Machine-Learning for Optimization of Software Parameters", IP.com No. IPCOM000252023D, IP.com, Electronic Publication Date: Dec. 13, 2017, 35 pages.
Anonymously, "Semi-Supervised Classification Using Object Metadata", IP.com No. IPCOM000252345D, IP.com, Electronic Publication Date: Jan. 5, 2018, 34 pages.
Hernandez, Julio et al., "Multidimensional Hierarchical Classification", Expert Systems with Applications, vol. 41, Issue 17, Dec. 1, 2014, 7 pages.
Maji, Pradipta, "Efficient design of neural network tree using a new splitting criterion", Neurocomputing, vol. 71, No. 4, Jan. 1, 2008, pp. 787-800.
Perera, Sujan et al., "Optimizing Hierarchical Classification with Adaptive Node Collapses", The Workshops of the Thirty-Second AAAI Conference on Artificial Intelligence, Feb. 2-7, 2018, 4 pages.
Verma, Nakul et al., "Learning Hierarchical Similarity Metrics", 2012 IEEE Conference on Computer Vision and Pattern Recognition, Jun. 16-21, 2012, 8 pages.
Wang, Xiao-Lin et al., "A Meta-Top-Down Method for Large-Scale Hierarchical Classification", IEEE Transactions on Knowledge and Data Engineering, vol. 26, No. 3, Mar. 2014, pp. 500-513.
Cateni, Silvia et al., "A Method for Resampling Imbalanced Datasets in Binary Classification Tasks for Real-World Problems", Neurocomputing, vol. 135, Jul. 5, 2014, 10 Pages.
Chawla, Nitesh V. et al., "SMOTE: Synthetic Minority Oversampling Technique", Journal of Artificial Intelligence Research 16 (2002) Submitted Sep. 2001; published Jun. 2002, 37 pages.
Chung, Yu-An et al., "Cost-aware Pre-training for Multiclass Cost-sensitive Deep Learning", generarXiv: 1511.09337v3 [cs.LG] May 24, 2016, 7 pages.
Drummond, Chris et al., "C4.5, Class Imbalance, and Cost Sensitivity: Why Under-Sampling beats Over-Sampling", Workshop on Learning from Imbalanced Datasets II, ICML, Washington DC, Aug. 2003, 8 pages.
Ghazikhani, Adel et al., "Online neural network model for non-stationary and imbalanced data stream classification", International Journal of Machine Learning and Cybernetics. Feb. 2014;5(1):12 pages.
Huang, Chen et al., "Learning Deep Representation for Imbalanced Classification", 2016 IEEE Conference on Computer Vision and Pattern Recognition (CVPR), Jun. 2016, 10 pages.
Maurya, Chandresh K. et al., "Online Sparse Class Imbalance Learning on Big Data", Neurocomputing vol. 216, Dec. 5, 2016, 12 pages.
Ouyang, Wanli et al., "Factors in Finetuning Deep Model for Object Detection with Long-tail Distribution", 2016 IEEE Conference on Computer Vision and Pattern Recognition (CVPR), Jun. 2016, 10 pages.
Salakhutdinov, Ruslan et al., "Learning to Share Visual Appearance for Multiclass Object Detection", IEEE Computer Vision and Pattern Recognition (CVPR) Jun. 2011, 8 pages.
Shen, Wei et al., "DeepContour: A Deep Convolutional Feature Learned by Positive-sharing Loss for Contour Detection", 2015 IEEE Conference on Computer Vision and Pattern Recognition (CVPR) Jun. 2015, 10 pages.
Sun, Zhongbin et al., "A Novel Ensemble Method for Classifying Imbalanced Data", Pattern Recognition, vol. 48, Issue 5, May 2015, 15 Pages.
Tahir, Muhammad A. et al., "A multiple expert approach to the class imbalance problem using Inverse Random Under Sampling", Conference: Multiple Classifier Systems, 8th International Workshop, MCS 2009, Reykjavik, Iceland, Jun. 10-12, 2009, 10 pages.
Tian, Jiang et al., "Imbalanced classification using support vector machine ensemble", Neural Computing and Applications vol. Mar. 20, 2011, 8 pages.
Wang, Yu-Xiong et al., "Learning to Model the Tail", 31st Conference on Neural Information Processing Systems (NIPS 2017), May 2017, 11 pages.
Zhou, Yucan et al., "Deep Super-Class Learning for Long-Tail Distributed Image Classification", Pattern Recognition vol. 80, Aug. 2018, 29 Pages.
Zhou, Zhi-Hua et al., "Training Cost-Sensitive Neural Networks with Methods Addressing the Class Imbalance Problem", IEEE Transactions on Knowledge and Data Engineering, vol. 18, No. 1, 14 pages, Jan. 2006.

* cited by examiner

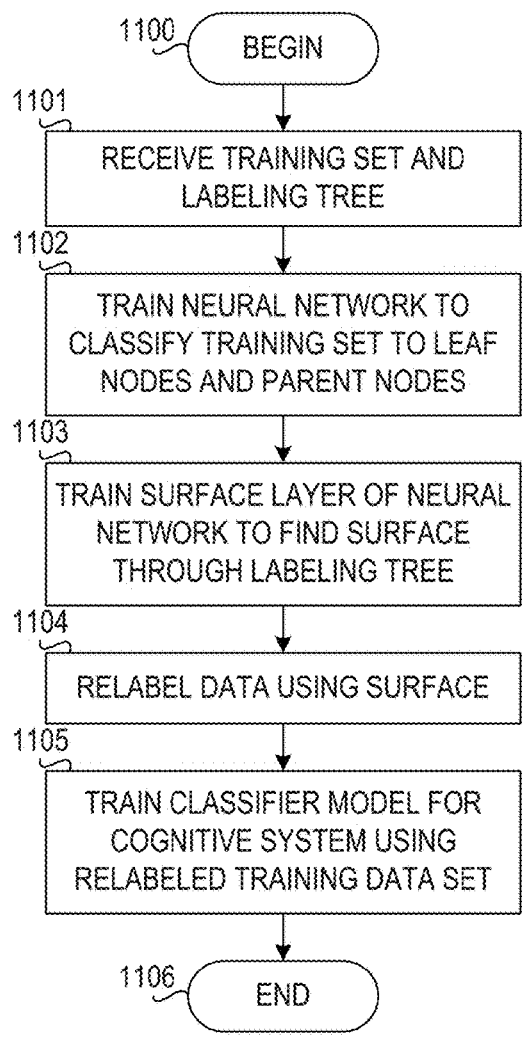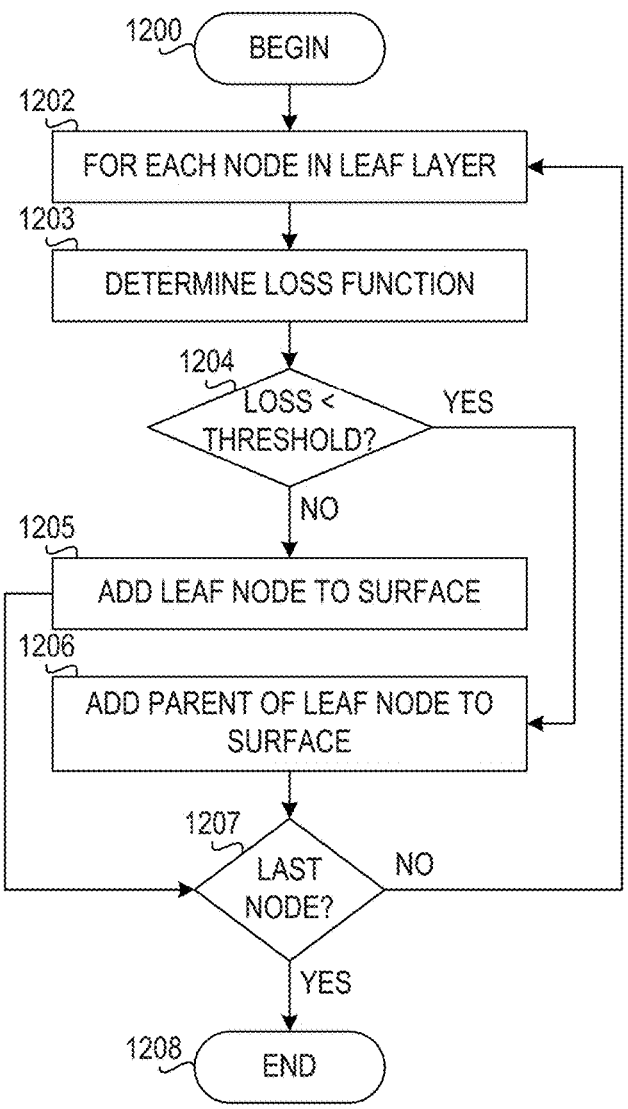

OPTIMIZING HIERARCHICAL CLASSIFICATION WITH ADAPTIVE NODE COLLAPSES

BACKGROUND

The present application relates generally to an improved data processing apparatus and method and more specifically to mechanisms for optimizing hierarchical classification with adaptive node collapses.

Data intensive solutions, such as solutions that include machine learning components, are becoming more and more prevalent. The standard way of developing such solutions is to train machine learning models with manually annotated or labeled data for a given task. This methodology assumes the existence of ample human annotated data.

A hierarchical classifier is a classifier that maps input data into defined subsumptive output categories. The classification occurs first on a low-level with highly specific pieces of input data. The classifications of the individual pieces of data are then combined systematically and classified on a higher level iteratively until one output is produced. This final output is the overall classification of the data. Depending on application-specific details, this output can be one of a set of predefined outputs, one of a set of on-line learned outputs, or even a new novel classification that hasn't been seen before. Generally, such systems rely on relatively simple individual units of the hierarchy that have only one universal function to do the classification. In a sense, these machines rely on the power of the hierarchical structure itself instead of the computational abilities of the individual components. This makes them relatively simple, easily expandable, and very powerful.

The outcomes of the classification algorithms are sensitive to the distribution of the instances over target labels in the datasets for both traditional machine learning and deep learning models. They can produce superior outcomes when the training data contain a fair and diverse representation for each target label. However, many real-world datasets for large scale classification tasks exhibit a long tail distribution over target labels. For example, the adverse events reported for drugs are heavily skewed towards benign adverse events such as headache and stomachache, and luckily have few occurrences of severe events such as blood clot and death. Machine learning models trained on classification tasks defined over such datasets such as medical coding of adverse events could produce non-comprehensible errors to humans, for instance, classifying a disorder related to skin (e.g., dry skin) as disorder related to feet (e.g., discomfort feet). Such observations can be attributed to the under-representation of these labels in the training dataset. Hence, it is important to understand practical limitations of a learning algorithm with respect to a given labelled dataset and mitigate the errors made by the models. The illustrative embodiments described herein address this problem for hierarchical classification task.

The common factors considered to assess the feasibility and limitations of applying a machine learning solution to classification tasks are the number of instances per target label and the properties of data distribution over labels (i.e., uniform distribution, skewed distribution, etc.). However, models could find it difficult to learn classes with fine-grained semantic differences even with a reasonable amount of training data. For example, distinguishing the instances of throbbing headache, migraine, and intermittent headache would be challenging despite the presence of reasonable amount of training data. This is due to the extensive domain knowledge required to interpret these events which is difficult to learn solely from the data. Hence, it is important to take the semantic properties of labels into account in addition to their statistical properties when assessing the feasibility and limitations of a machine learning solution.

The research an reducing the negative impact of long-tail distributions to the classification algorithms has taken the approaches of fixing the datasect to reduce the imbalance, fixing algorithm to minimize the sensitivity to data imbalance, ensemble approaches to use classifiers trained by balancing different dataset created using resampling, and fine tuning the models by learning the features for minority labels from the majority labels. See Yu-Xiong Wang, Deva Ramanan, and Martial Hebert, 2017, entitled "Learning to Model the Tail. In Advances in Neural Information Processing Systems, pages," 7029-7039, and Wanli Ouyang, Xiaogang Wang, Cong Zhang, and Xiaokang Yang, 2016, entitled "Factors in Finetuning Deep Model for Object Detection with Long-Tail Distribution," In Proceedings of the IEEE Conference on Computer Vision and Pattern Recognition, pages 864-873.

The main strategies used for fixing the dataset are over-sampling and under-sampling and hybrid-sampling. See Nitesh V Chawla, Kevin W Bowyer, Lawrence O Hall, and W Philip Kegclmeyer, 2002, entitled "Smote: Synthetic Minority Over-Sampling Technique," Journal of Artificial Intelligence Research, 16:321-357; Muhammad Atif Tahir, Josef Kittler, Krystian Mikolajczyk, and Fei Yan, 2009, entitled "A Multiple Expert Approach to the Class Imbalance Problem Using Inverse Random under Sampling." in International Workshop on Multiple Classifier Systems, pages 82-91, Springer, Silvia Cateni, Valentina Colla, and Marco Vannucci, 2014, entitled "A Method for Resampling Imbalanced Datasets in Binary Classification Tasks for Real-World Problems," Neurocomputing, 135:32-41. These methods have undesirable outcomes including the risk of losing informative instances through under-sampling and computational cost and the risk of overfitting of the algorithm through over-sampling. See Chris Drummond, Robert C Holte, et al., 2003, "C4 5, Class Imbalance, and Cost Sensitivity: Why Undersampling Beats Over-Sampling," in Workhop on Learning from lmbalanced Dataseta II, volume 11, pages 1-8. Citeseer. The algorithmic approach to minimize the impact of data imbalance focus on modifying the cost function to account for mistakes made for the minority labels. See Yu-An Chung, Hsuan-Tien Lin, and Shao-Wen Yang, 2015, "Cost-Aware Pre-Training for Multiclass Cost-Seasitive Deep Learning," arXiv preprint arXiv: 1511.09337; Chen Huang, Yining Li, Chen Change Loy, and Xiaoou Tang, 2016, "Learning Deep Representation for Imbelanced Classification," in Proceedings of the IEEE Conference on Computer Vision and Pattern Recognition, pages 5375-5384; Zhi-Hua Zhou and Xu-Ying Liu, 2006, "Training Costsensitive Neural Networks with Methods Addressing the Class Imbalance Problem," IEEE Transactions on Knowledge & Data Engineering, (1):63-77; Wei Shen, Xinggang Wang, Yan Wang, Xiang Bai, and Zhijiang Zhang, 2015, "Deepcontour: A Deep Convolutional Feature Learned by Positive-Sharing Loss for Contour Detection," in Proceedings of the IEEE Conference on Computer Vision and Pattern Recognition, pages 3982-3991; Adel Ghazikhani, Reza Monsefi, and Hadi Sadoghi Yazdi, 2013, "Online Cost-Sensitive Neural Network Classifiers for Non-Stationary and Imbalanced Data Streams," in Neural Computing and Applications, 23(5):1283-1295; Chandresh Kumar Maurya, Durga Toshniwal, and Gopalan Vijendran Venkoparao, 2016, "Online Sparse Class Imbalance Learning on Big Data," Neurocomputing, 216:250-260.

Such strategies including the ensemble methods may lead to classification errors for majority labels otherwise wouldn't have made by the algorithm. See Zhongbin Sun, Qinbao Song, Xiaoyan Zhu, Heli Sun. Baowen Xu, and Yuming Zhou, 2015, "A Novel Ensemble Method for Classifying Imbalanced Data," Pattern Recognition, 48(5):1623-1637; Jiang Tian, Hong Gu, and Wenqi Liu, 2011, "Imbalanced Classification Using Support Vector Machine Ensemble," Neural Computing and Applications, 20(2):203-209.

The Illustrative embodiments of the present invention do not attempt to improve the classification results by artificially fixing the dataset or modifying the algorithm to add a special treatment for pre-selected label set. Instead, the objective is to find the specificity level of the labels that can be learn by the algorithm in order to improve the overall accuracy and significantly reduce the effort and resources required to correct the incorrect predictions. In contrast to the above approaches, the illustrative embodiments of the present invention do not presume that only minority labels need a remedy. The number of data points of a label does not solely determines its accuracy, if its data points are naturally less diverse or inherently distinguishable from other instances, it would be possible to learn this label without many examples; furthermore, some labels are difficult to learn despite the presence of many data points. Hence, the illustrative embodiments of the present invention aim to reformulate the classification problem guided by the projected accuracy per label However, the illustrative embodiments may not produce the most specific label for some data points.

Similar ideas are explored in computer vision and image classification. See Ruslan Salakhutdinov, Antonio Torralba, and Josh Tenenbaum, 2011, "Learning to Share Visual Appearance for Multiclass Object Detection," in CVPR 2011, pages 1481-1488, IEEE; Wanli Ouyang Xiaogang Wang, Cong Zbang, and Xiaokang Yang, 2016. "Factors in Finetuning Deep Model for Object Detection with Long-Tail Distribution," in Proceedings of the IEEE Conference on Computer Vision and Pattern Recognition, pages 864-873; Yucan Zhou, Qinghua Hu, and Yu Wang, 2018, "Deep Super-Class Learning for Long-Tail Distributed Image Classification," Pattern Recognition, 80:118-128. This work is focused on grouping the similar labels with the aim of sharing the knowledge from instances of majority labels with minority labels to assist in classifying instances of minority labels. The illustrative embodiments of the present invention do not attempt to provide assistant to minority labels. The grouping performed in the approach of the present invention is driven by the projected accuracy of the labels and would allow similar labels to be in different groups and labels to be in groups of their own as long as they can distinguish themselves from other labels.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system having a processor and a memory. The memory comprises instructions which are executed by the processor to cause the processor to implement a training system for finding an optimal surface for hierarchical classification task on an ontology. The method comprises receiving, by the training system, a training data set and a hierarchical classification ontology data structure. The method further comprises generating, by the training system, a neural network architecture based on the training data set and the hierarchical classification ontology data structure, wherein the neural network architecture comprises an indicative layer, a parent tier (PT) output and a lower leaf tier (LLT) output. The method further comprises training, by the training system, the neural network architecture to classify the training data set to leaf nodes at the LLT output and parent nodes at the PT Output. The method further comprises determining, by the indicative layer in the neural network architecture, a surface that passes through each path from a root to a leaf node in the hierarchical ontology data structure. The method further comprises training, by the training system, a classifier model for a cognitive system using the surface and the training data set.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of the operations outlined above with regard to the method illustrative embodiment.

In one example embodiment, the neural network architecture comprises a convolutional neural network architecture.

In another example embodiment, the indicative layer generates for each given node in the lower leaf tier a value representing a probability that the surface contains the given node or its parent.

In another example embodiment, determining the surface comprises comparing the loss value for each given node in the lower leaf tier to a threshold, adding the given node to the surface responsive to the loss value being greater than or equal to the threshold, and adding a parent node of the given node to the surface responsive to the loss value being less than the threshold In yet another example embodiment, training the classifier model comprises relabeling the training data set based on the surface and one or more adaptive node collapses in the hierarchical classification ontology data structure.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 11 is a flowchart illustrating operation of a mechanism for training a model for optimizing hierarchical classification with adaptive node collapses in accordance with an illustrative embodiment; and FIG. 12 is a flowchart illustrating operation of a mechanism for training the surface layer of the model to find the surface through the hierarchical labeling tree in accordance with an illustrative embodiment.

DETAILED DESCRIPTION

Figure 1:
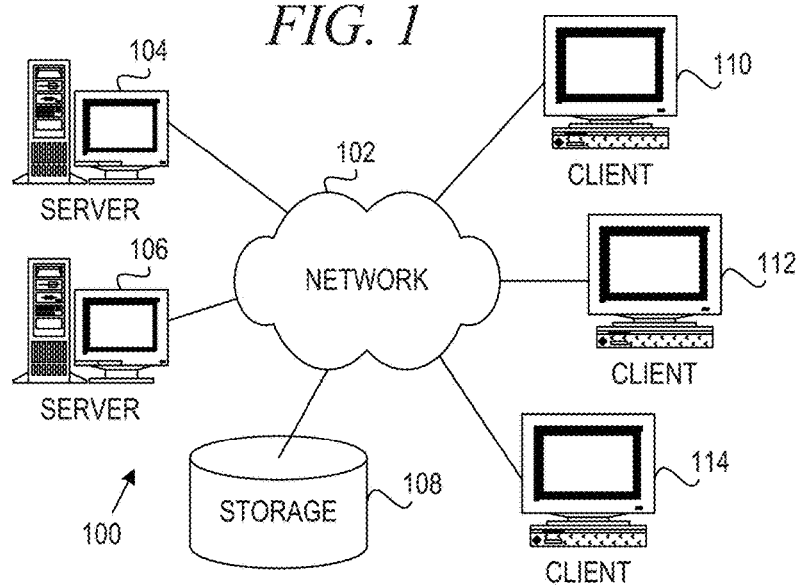
FIG. 1 is an example diagram of a distributed data processing system in which aspects of the illustrative embodiments may be implemented.

Data intensive solutions rely on data and on machine learning models that generalize from this data. In many of the real-world problems, the quantity and the quality of the data challenge the machine learning algorithms. In particular, the large-scale hierarchical classification problems are challenged by the data distribution and complexity of the hierarchy. This is prevalent in the medical domain where hierarchical classification tasks like coding the medical conditions to International Classification of Disease (ICD) hierarchy, coding adverse events to Medical Dictionary for Regulatory Activities (MedDRA) hierarchy and coding drug and compounds to World Health Organization Drug Dictionary (WHODD) hierarchy are essential for various purposes like diagnosing, billing, monitoring drug safety, secondary analysis tasks and regulatory processes. The main challenges in solving these problems include:

Long tail distributions, making it infeasible to learn all the data classes (labels), because there is insufficient training data for classes appearing in the long tai.

Hierarchy of labels. There is a trade-off between the level of label details (there are more details lower in the hierarchy) and the amount of training data available (there is less data lower in the hierarchy).

Often, the goal is to learn the most specific concept, i.e., cover the lowest level hierarchy classes. Of course, the requirement is to do so with sufficiently high accuracy.

Given these challenges, it is important to understand the limitations of the machine learning models with respect to the quality and quantity of the available dataset. In a hierarchical classification problem, it may not be possible to train a classifier that always classifies instances to a leaf node. For example, if a particular leaf node has only a few training examples or the existing examples are significantly diverse in terms of their semantics, the classification algorithm may find it difficult to learn to classify to this node. In such cases, it may make sense to train a classifier that is capable of classifying to the parent of that node. The goal of the illustrative embodiments is to find a surface in the hierarchy that maximizes a combination of: (1) the classification accuracy; and, (2) coverage of leaf nodes in the hierarchy.

The illustrative embodiments provide a mechanism for determining a combination of nodes over which to train a cognitive system from an ontology or a labeling hierarchy. The illustrative embodiments balance accuracy with class coverage by taking into account the fact that some classes in the labeling hierarchy of the training data set do not have enough training data or contain particularly difficult semantics while other classes have great semantic diversity among the training data, e.g., the training dataset has a long tail distribution. The mechanism of the illustrative embodiments, given a set of training data for a classification task, finds a surface in the labeling hierarchy, or line, that maximizes the accuracy of predictions and the coverage of specific classes in the hierarchy.

Prior art solutions determine which classes can or cannot be used to train a cognitive system. The prior art solutions select the classes that can be trained and ignore other classes. In contrast, the mechanism of the illustrative embodiments does not ignore the classes. The mechanism of the illustrative embodiments determines the abstractness level expressed as a surface or line in the hierarchy, that can be used to train the classification model or algorithm.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
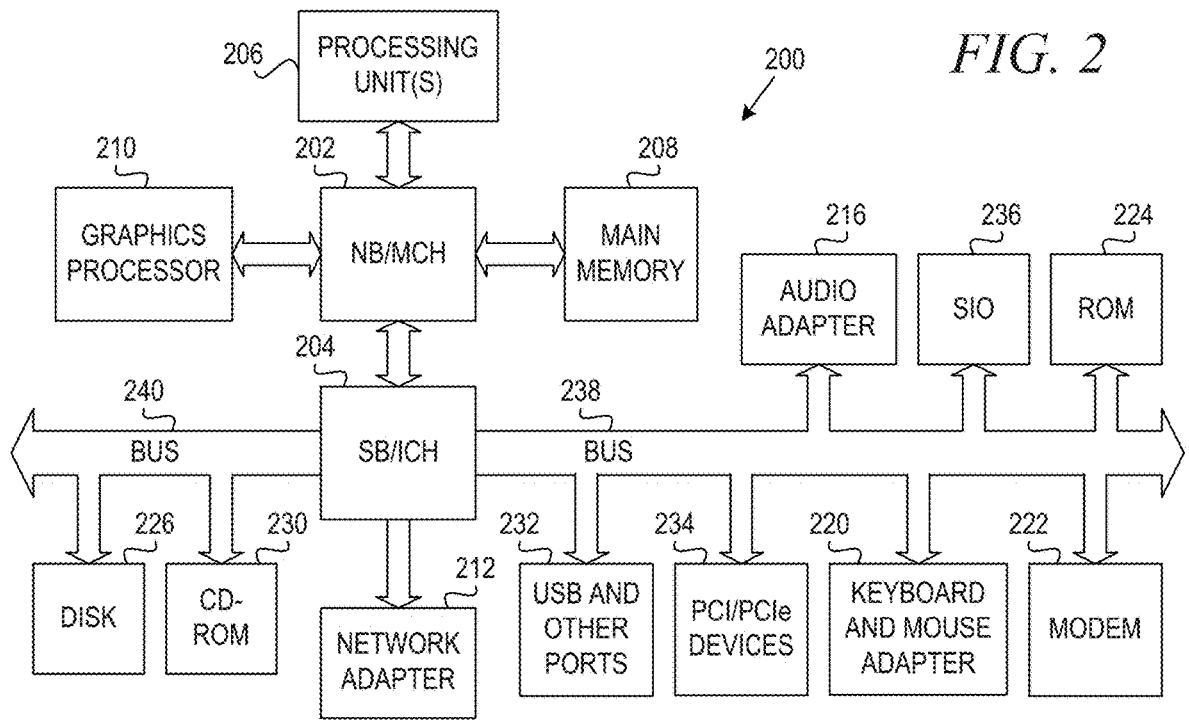
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Interact with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a classifier training system with a surface finding component that finds the optimal surface for a hierarchical classification on an ontology. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates finding an optimal surface for a hierarchical classification on an ontology.

As noted above, the mechanisms of the illustrative embodiments utilize specifically configured computing devices, or data processing systems, to perform the operations for an optimal surface finding component. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the classifier training system with a surface finding component that finds the optimal surface for a hierarchical classification on an ontology.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
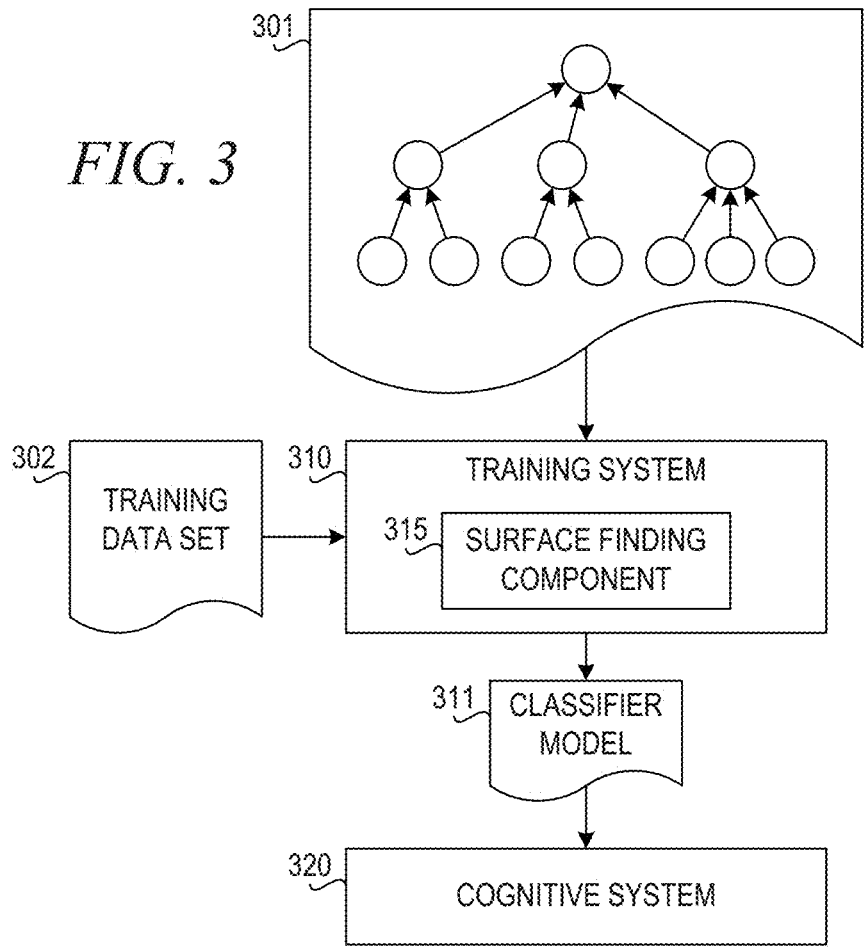
FIG. 3 is a block diagram of a training system including a surface finding component for finding an optimal surface for a hierarchical classification task on an ontology in accordance with an illustrative embodiment.

FIG. 3 is a block diagram of a training system including a surface finding component for finding an optimal surface for a hierarchical classification task on an ontology in accordance with an illustrative embodiment. Training system 310 receives a training data set 302 for training a classifier model 311 on an ontology or labeling hierarchy 301 for cognitive system 320. Under control of classifier model 311, cognitive system 320 classifies data into classes in ontology 301. Cognitive system 320 may perform a cognitive operation, such as natural language processing, question answering, decision support, etc. In one example, cognitive system 320 may perform a hierarchical classification task to classify training data based on an ontology in the medical domain.

In one example embodiment, training system 310 receives ontology as single level labels. The training system 310 may then create disjoint aggregations over such labels and treat the original labels as the lowest level and the aggregation as the level above it to form the hierarchical labeling hierarchy 301. In other words, the training system 310 may receive a single level of labels and generate a hierarchical labeling ontology data structure 301 from the single level labels.

Training system 310 includes surface finding component 310 for finding the optimal surface for hierarchical classification tasks on ontology 301. For example, a classification task may seek to classify an adverse event (AE) to a particular medical code; however, the training data 302 may have some codes that have a large amount of training data and others that do not have very much training data. A long tail distribution is a training data set in which there are many training instances for some classes, but the number of training instances decreases rapidly and there are much fewer training instances for a majority of the classes in the ontology. Therefore, the classifier model 311 can be trained with greater specificity for the classes with the most training instances in training data set 302, but the classifier model 311 can be trained at a higher level for the classes with fewer training instances. When training the classifier model 311 for cognitive system 320, given a long tail distribution, the problem is how to get a good training data set to train the cognitive system to perform an accurate classification while including as many leaf nodes in the hierarchy as possible. Clients using the cognitive system 320 for classification want a cognitive system that is trained on as many leaf nodes as possible as they represent more specific classification results, but there may be insufficient training data for accurately classifying into these classes. Thus, inclusion of leaf nodes tends to reduce accuracy.

The illustrative embodiments propose a solution to identify the level of specificity of a label that can be learned given a dataset of a classification task which is defined over a hierarchically arranged label set. It is possible that with compromise on the specificity some labels, for instance throbbing headache and intermittent headache, grouping them as one, it may help to distinguish their instances from the migraine instances. The illustrative embodiments define a surface over a hierarchy to be a set of hierarchy tree nodes that intersect once each path from the root of the hierarchy (highest level node) to the leaves of the hierarchy (lowest level nodes). FIGS. 4A-4D illustrate the trade-off between accuracy and leaf node coverage in accordance with an illustrative embodiment. The hierarchy 400 has three levels. The ideal scenario would be that the training data set contains sufficient data with high quality to train a classifier that can classify new instances to one of the seven leaf nodes. However, when the training data does not satisfy the above requirement, it is important to decompose the problem and solve sub-problems.

The goal of the illustrative embodiments is to find the segment of the hierarchy 400 where the training system can train the model to classify at leaf node level and the segment where the training system has to restrict the classification problem to higher level in the hierarchy 400. This segmentation is indicated with a line drawn on the hierarchy referred to herein as the "surface." However, the training system should keep a balance when drawing the surface on the hierarchy. As shown in the FIG. 4A, as the surface S1 is moved up, the classifier model can potentially get a higher accuracy but may lose the specificity of the classification results. Hence, it is important to cover as many leaf nodes as possible while attaining the desired accuracy level.

Figure 4A:
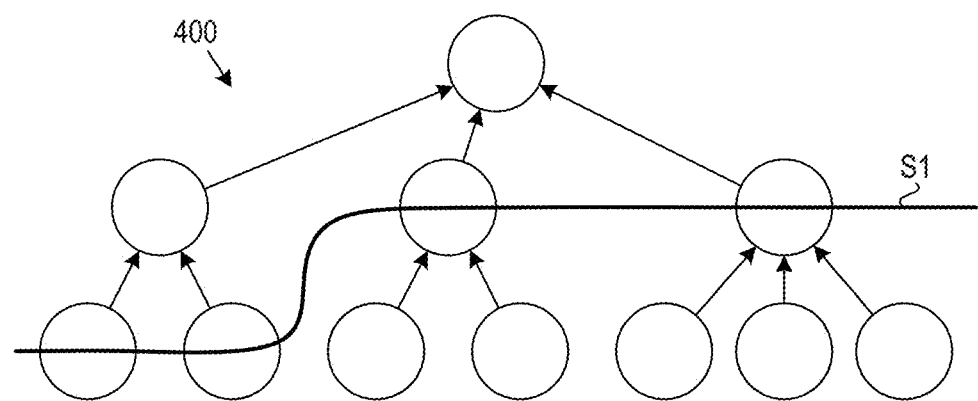
FIGS. 4A-4D illustrate the trade-off between accuracy and leaf node coverage in accordance with an illustrative embodiment.
Figure 4B:
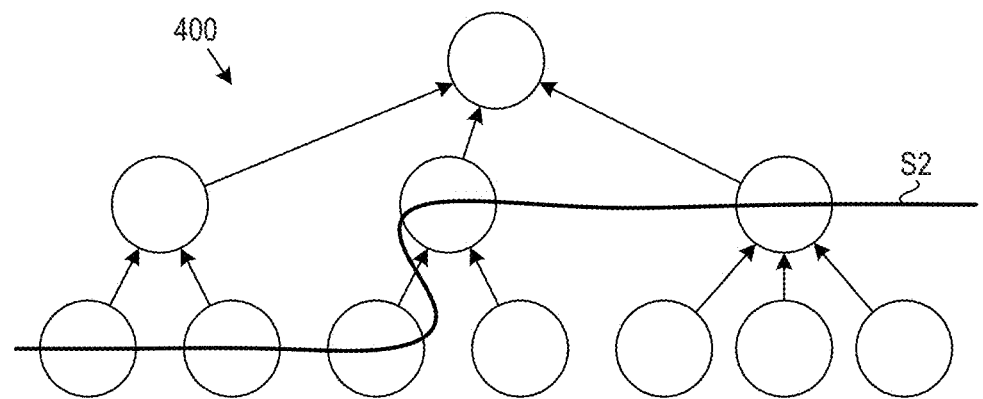
Figure 4C:
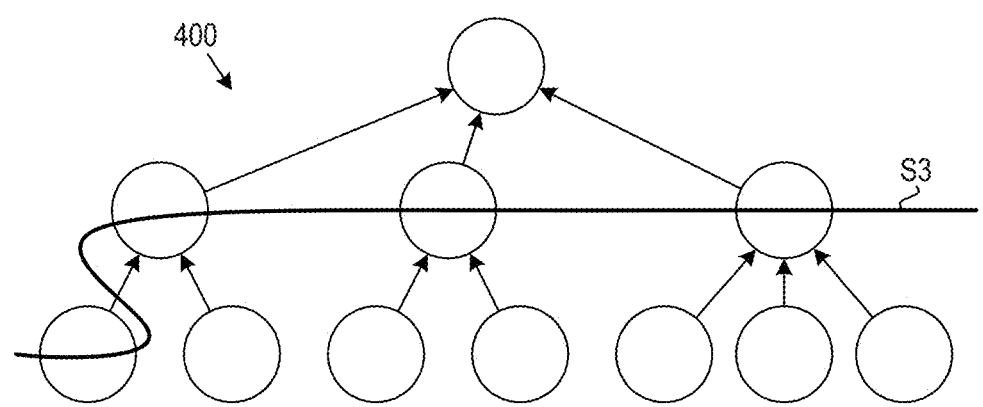
Figure 4D:
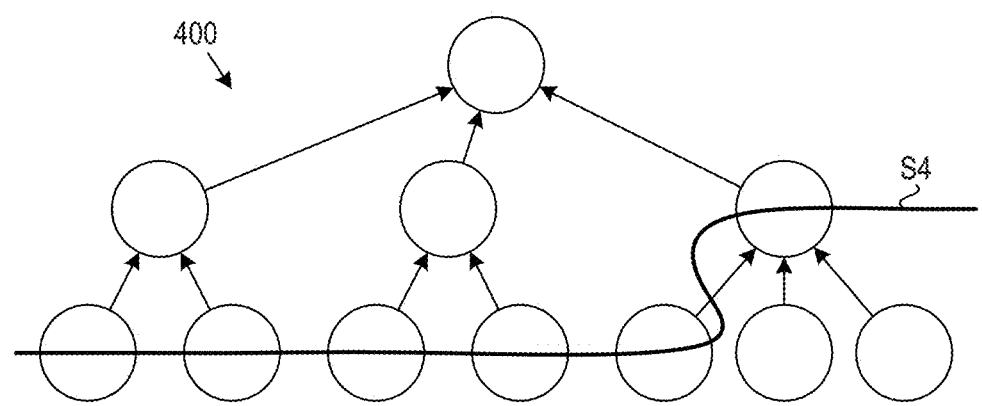

As seen in FIG. 4A, the number of leaf nodes through which surface S1 passes is two. Turning to FIG. 4B, the number of leaf nodes through which surface S2 passes is three; however, note that surface S2 passes through each class or each path from the root to a given leaf. With reference now to FIG. 4C, surface S3 passes through each class of hierarchy 400 but only passes through one leaf node. In FIG. 4D, surface S4 passes through five leaf nodes. Thus, surface S3 in FIG. 4C may achieve more accurate results with less specific classification for most classes, but surface S4 may cover more leaf nodes for more specific results but may sacrifice accuracy.

The defined optimization problem balances the need for accuracy and the coverage of leaf nodes. The mechanism starts with a surface and calculates the accuracy and the number of leaf nodes covered, and optimizes over these characteristics. The task of classifying to the leaves that are not included in the surface should be handled separately. A possible approach is to implement a non-learning solution for these leaf classes (e.g., a dictionary). Another possible approach is to implement a learning solution, where there is only a need to classify the nodes under the chosen surface node. For those leaf nodes of the hierarchy not included in the surface, the mechanism determines the correct parent class for the data instance. This allows the training system to train a separate classifier for leaf nodes under this parent to determine their leaf node. Note that this classifier is easier to train relative to the large classifier and would have less impact from the long-tailed data distribution due to a significantly smaller number of classes.

The illustrative embodiments provide a neural network architecture that learns the surface as an auxiliary task while learning to classify the input to corresponding labels. The discussion in this paper presents our solution to find the surface that limits itself to the last two levels in the hierarchy and we will discuss why it is a preferable design decision and strategy to find surfaces that may include nodes from more abstract layers. The contributions of this paper are:

1. Propose a novel neural network architecture and loss function that provide an efficient and automated solution to find the surface in a label hierarchy for a given dataset.

2. Demonstrate the effectiveness of the proposed solution for a medical coding task and quantify the trade-off between classification accuracy and the leaf node coverage by the surface.

3. Present an study on the characteristics of the nodes that tend to move up to define the surface.

Given a labelled dataset for a hierarchical classification task where the labels are given at the most specific level in the hierarchy, the illustrative embodiments provide a mechanism that attempts to find a surface in the hierarchy that maximizes the classification accuracy and the coverage of most specific labels in the hierarchy. The following description uses the following notation: S is the surface in the labeling hierarchy, or line, that maximizes the accuracy of predictions and the coverage of specific classes in the hierarchy; T denotes the label hierarchy; $level_l$ denotes the leaf node level in T; $leaf_i$ denotes a leaf node i in T; $level_p$ denotes the parent level of $level_l$; and, $parent_j$ denotes node j in $level_p$.

Figure 5:
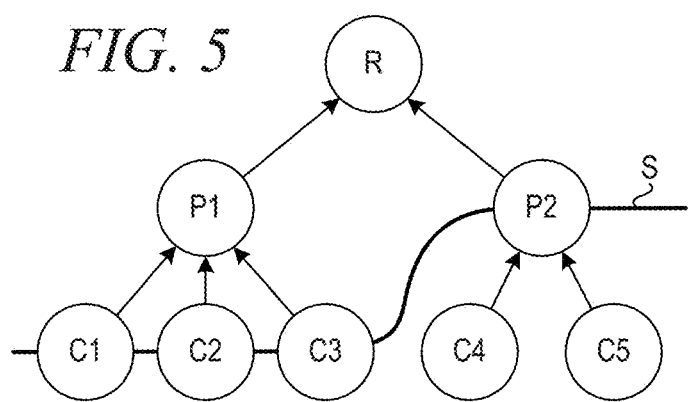
FIG. 5 depicts a three level labeling tree in accordance with an illustrative embodiment.

The mechanism receives a labeled data set $(x_1, y_1), \ldots, (x_n, y_n)$ were $x_i$ is a data point and $y_i$ its associated label, $i=1, \ldots, n$. The mechanism further receives a rooted hierarchical classification tree, (T, r), were r is the root of the tree T, and $y_i$ are leafs in T. The mechanism attempts to learn a model that classifies a new data point x. For example, FIG. 5 depicts a three level labeling tree in accordance with an illustrative embodiment:

$T=\{(R,P1),(R,P2),(P1,C1),(P1,C2),(P1,C3),(P2,C4),(P2,C5)\}$ $s=(C1,C2,C3,P2)$

Where T is a label tree and s is a possible surface as depicted by the line over the tree nodes.

The objective function is to find the surface S with an accuracy function for learning the algorithm L is $f(L)$ and depth of the node i is $l_i$. The mechanism attempts to maximize the function $g(s)=f(L_s)+\Sigma_{i=1}^{Y} l_i$, where m is the weight value and Y is the number of nodes that are crossed by the surface S.

Given that the label hierarchy, (T,r), is a rooted tree, each leaf $l \in T$, has a unique path, p(l), from r to l (p(l) is a set of vertices in the tree). An abstraction, $a(l) \in p(l)$, associates a vertex, a(l), with the leaf l. Such an abstraction results in a relabeling of the original data set to $(x_1, a(y_1)), \ldots, (x_n, a(y_n))$. The level of the abstraction of a leaf $l \in T$ is determined by the length of the path from a(l) to l and is denoted by length(a(l)).

The objective is to find an abstraction a( ) for each y and a model m( ) that classifies at that abstraction level, i.e., its labels are $\{(a(l)|l$ is a leaf in $T)\}$, that maximizes the following objective function on the test set $$w * \Sigma \frac{(m(x) == a((y_i)))}{n} + (1-w) * \frac{1}{\Sigma \text{length}(a(y_i))}.$$

The mechanism thus attempts to achieve maximal accuracy with minimal abstraction. The w denotes the priority given to accuracy versus abstraction in the optimization process. The illustrative embodiment focuses on abstraction with length(a(l)) being zero or one (i.e., surfaces go through leaf nodes and their parents in the tree T).

Figure 6:
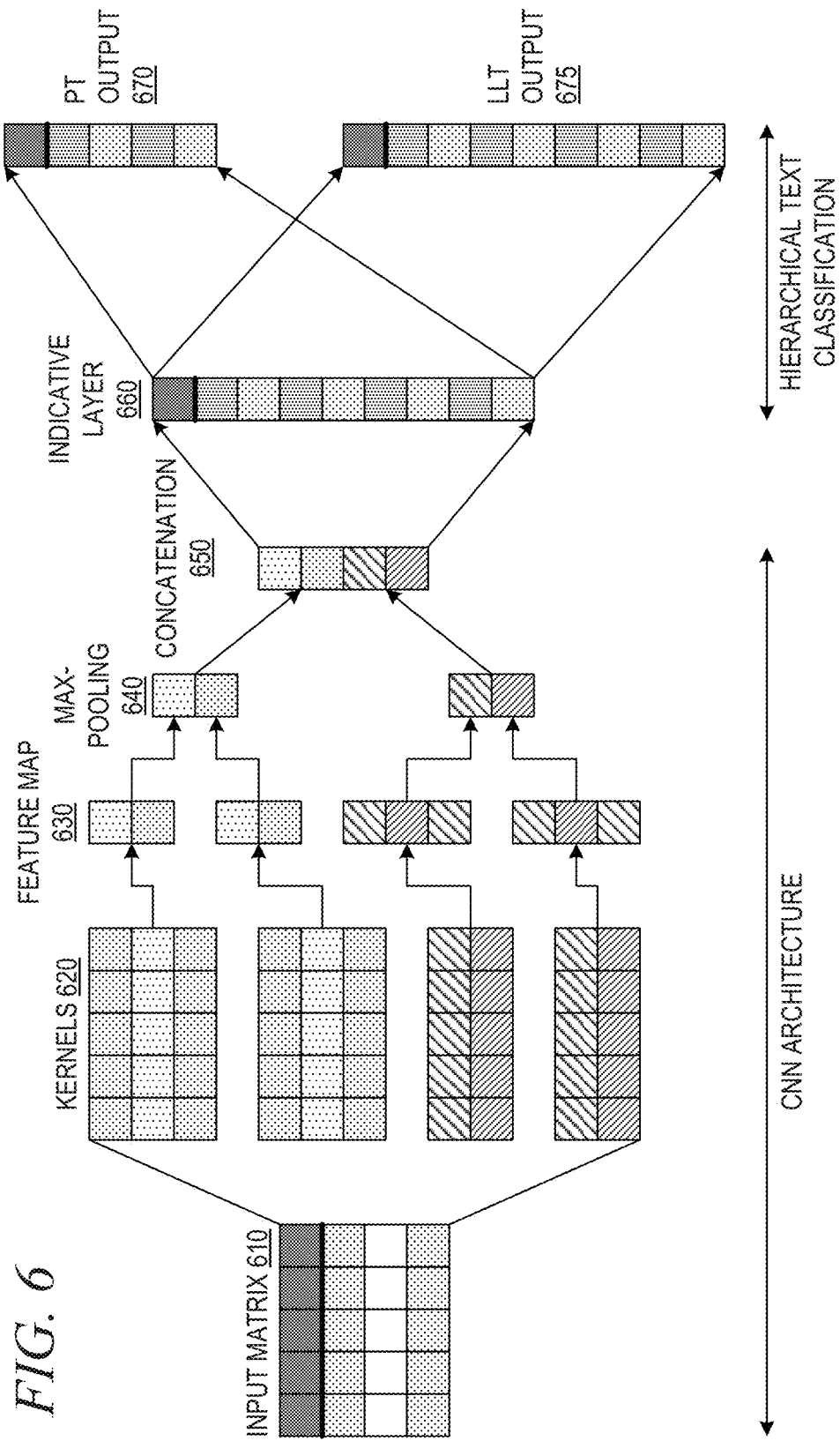
FIG. 6 illustrates neural network architecture with hierarchical text classification in accordance with an illustrative embodiment.

FIG. 6 illustrates neural network architecture with hierarchical text classification in accordance with an illustrative embodiment. The convolutional neural network (CNN) architecture receives input matrix 610 and includes kernels layer 620, feature map layer 630, max-polling layer 640, and concatenation layer 650. The hierarchical text classification portion of the neural network includes indicative layer 660, patent node layer (referred to as the "preferred term" or "parent tier" (PT)) output 670, and leaf node layer (referred to as the "lowest level terms" or "lower leaf tier" (LLT)) output 675.

Figure 7:
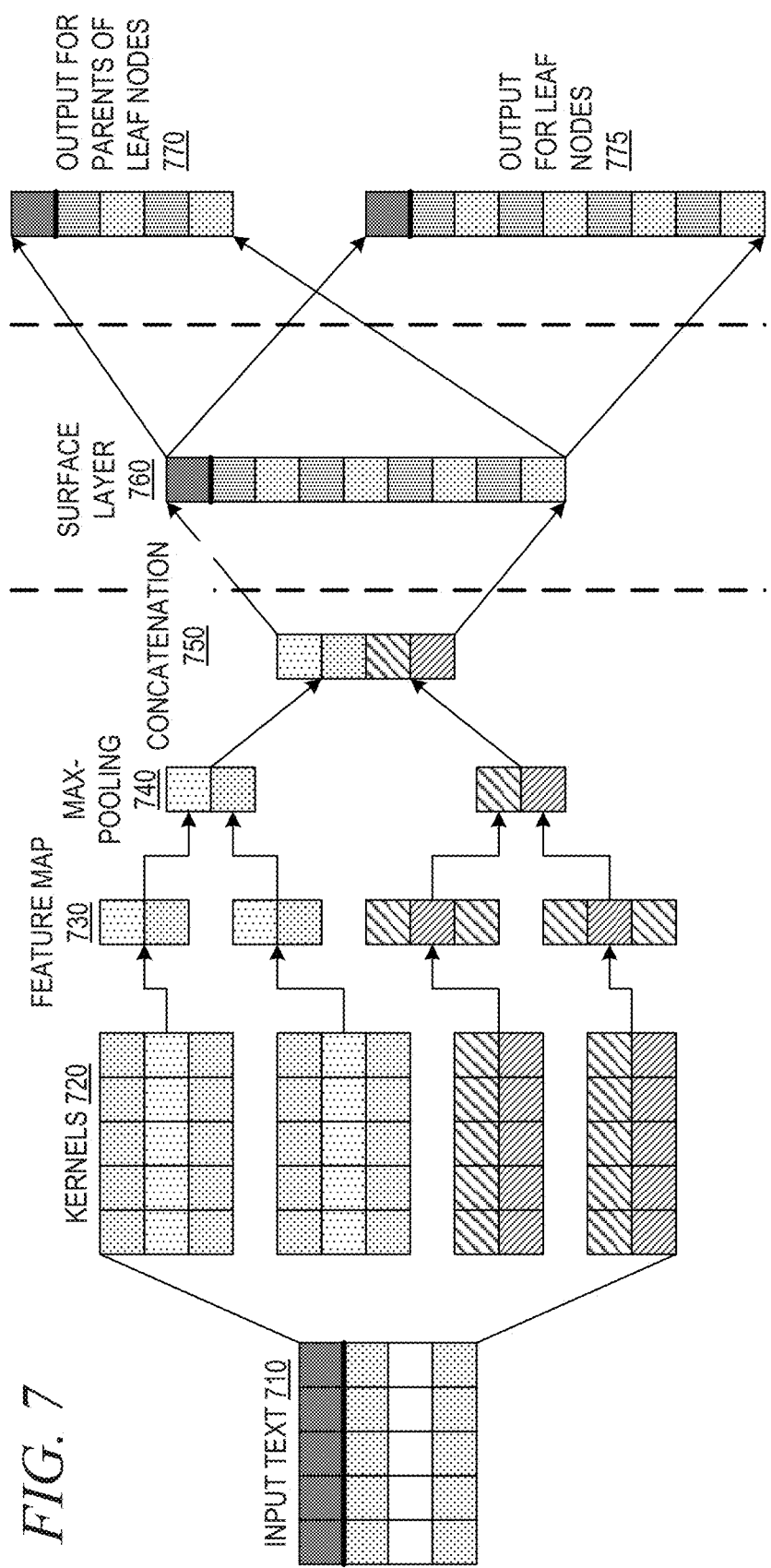
FIG. 7 illustrates neural network architecture to find the surface for a given dataset in accordance with an illustrative embodiment.

FIG. 7 illustrates neural network architecture to find the surface for a given dataset in accordance with an illustrative embodiment. The network has three logical components: 1) a convolutional neural network (CNN) component to learn the representation for the input, 2) the surface layer 760 to learn the surface S, and 3) the output layer with two parallel layers determining the label for input at $\text{level}_l$ 775 and $\text{level}_p$ 770. The output for parents of the leaf nodes 770 provides an output for each node in $\text{level}_p$. The output for the leaf nodes 775 provides an output for each node in $\text{level}_l$.

The CNN component receives input text 710 and includes kernel layer 720, feature map layer 730, max-pooling layer 740, and concatenation layer 750. The CNN component consists of a standard convolutional neural network with one convolution, activation, and max-pool layer. The objective of this component is to learn the representation for the input data that facilitates the identification of the correct label for input at the output layers.

The objective of surface layer 760 is to determine the surface for a given dataset. This is a fully connected layer of size same as the number of leaf nodes in the given label hierarchy. That is surface layer 760 provides a loss value for each leaf node in $\text{level}_l$. The values of this layer is interpreted as probabilities assigned to each leaf node which determines whether the surface S contains the leaf node or its parent. The mechanism applies the sigmoid activation function on the values of this layer to convert them to probabilities. The idea is that if the $i^{th}$ value of this layer is greater than a predefined threshold, the $\text{leaf}_i$ is considered as on the surface, otherwise its parent is included in the surface instead of $\text{leaf}_i$.

The objective of two parallel layers at output layer is to determine the predicted label for input at both $\text{level}_l$ and $\text{level}_p$. These two layers are designed as softmax layers of sizes same as number of nodes at $\text{level}_p$ and $\text{level}_l$ respectively. If the network is able to predict the correct label for the input at $\text{level}_l$ then we need to increase the corresponding probability value in the surface layer, whereas when network makes mistakes at $\text{level}_l$, the corresponding probability at surface layer need to be decreased. The two output layers provide the required feedback to the network to enable this mechanism.

The mechanism of the illustrative embodiment needs two labels for each training instance in order to train this network. The hierarchical structure of the labels provide required information to derive the second label for each instance. Assume the initial labelled dataset set $D=\{(x_1, y_1^l), \ldots, (x_n, y_n^l)\}$ where $y_i^l$ is a leaf node in the hierarchy. The mechanism obtains the parent of each $y_i^l$ and adds that as the second label for each training instance. The modified dataset would be $D_m=\{(x_1, y_1^l, y_1^p), \ldots, (x_n, y_n^l, y_n^p)\}$ where $y_i^p$ is the parent of $y_i^l$ according to T.

Figure 8:
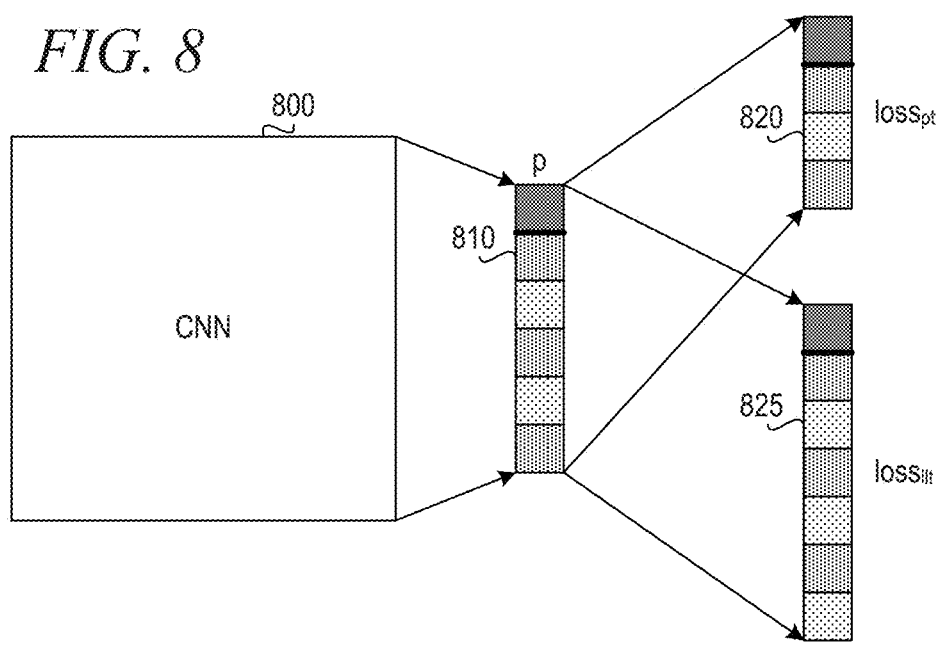
FIG. 8 illustrates building the loss function for the surface layer for determining the surface for training the hierarchical classifier in accordance with an illustrative embodiment.

FIG. 8 illustrates building the loss function for the surface layer for determining the surface for training the hierarchical classifier in accordance with an illustrative embodiment. As shown in FIG. 8, the surface layer 810 receives output from the convolutional neural network (CNN) 800 and generates loss values at the PT level ($\text{level}_p$) 820 and the LLT level 825 ($\text{level}_l$). The loss function designed for the above network to learn the probability values at surface layer by leveraging the feedback generated at the output layer on $D_m$.

The objective of the loss function is to find nodes at level for which the classification can be performed with high accuracy and ones that can only be classified at $\text{level}_p$ with high accuracy. In order to measure the classification performance at each level, the illustrative embodiment uses the cross-entropy loss values for two layer.

$$\text{loss}_{\text{level}_l}=-\Sigma_{i=1}^{n} y^{li} \log(\hat{y}^{li}) \quad (1)$$

$$\text{loss}_{\text{level}_p}=-\Sigma_{i=1}^{m} y^{pl} \log(\hat{y}^{pi}) \quad (2)$$

Where n and m are the number of nodes at $\text{level}_l$ and $\text{level}_p$ in T respectively. Hence, the loss value of the network is:

$$\text{loss}=\text{loss}_{\text{level}_l}+\text{loss}_{\text{level}_p} \quad (3)$$

However, in this use case if the network is able to predict the correct label at $\text{level}_l$ but not at $\text{level}_p$, the objective is to minimize the contribution of $\text{loss}_{\text{level}_p}$ to the loss value of the network as our overall objective is to find the correct label at $\text{level}_l$.

$$\text{loss} = \text{loss}_{\text{level}_l} + (1-e^{-\text{los}^2_{\text{level}_l}})\text{loss}_{\text{level}_p} \quad (4)$$

Term $\left(1-e^{-\text{los}^2_{\text{level}_l}}\right)$ in equation (4) helps to fade away the contribution of $\text{loss}_{\text{level}_p}$ to the overall loss value as $\text{loss}_{\text{level}_l}$ decreases.

Equation (4) provides the feedback to the network from the classification output perspective. The illustrative embodiment uses this feedback to learn the surface in terms of probability values at the surface layer. In order to realize this, the mechanism adds a term to the loss function which gives feedback to the values in surface layer depending on the classification performance at the output layer.

$$\text{loss} = \text{loss}_{level_l} + (1 - e^{loss^2_{level_l}})\text{loss}_{level_p} - \log(1 - |(p - e^{-loss^2_{level_l}})|) \quad (5)$$

p in equation (5) denotes the probability the value in the surface layer corresponds to the relevant node at $level_l$ (i.e., if correct label is $y_i^l$, the p value denoted here is the $i^{th}$ value in surface layer). The model learns a value for p for each node in the leaf layer, which is the probability value at the surface layer. The last term in equation (5) forces the surface to go through the leaf node if $\text{loss}_{level_l}$ is a small value and it forces the surface to go through the parent node if $\text{loss}_{level_l}$ is a big value.

The loss value is an estimate of how good the model is at predicting PTs and LLTs. The mechanism of the illustrative embodiment uses the loss value to determine the probability value for the surface layer. For instance, if the loss value is less at LLT, that means the model can predict well at LLT, hence the probability value for that LLT in surface layer should be high. Once the mechanism learns the probability values for the surface layer, with the help of loss values at LLT and PT, they are compared with a threshold value. If a probability value is above the threshold then LLT goes to surface; otherwise, its parent goes to surface.

The output of the above network is the probability distribution over the surface layer indicating the probability of nodes at level being in the surface. The following logic is used to select the surface from the surface layer of the network.

```
input → layer_s, threshold
    output ← surface_s
    for i in len(layer_s) do
        if layer_s[i] ≥ threshold then
            add leaf_i to surface_s
        else
            add parent of leaf_i to surface_s
        end if
    end for
```

In the above, $layer_s[i]$ is the value generated at the surface layer, which denotes the probability the value in the surface layer corresponds to the relevant node at $level_l$. The threshold value threshold controls the priority given to accuracy versus abstraction in selecting the surface and it corresponds to the w in the optimization problem.

After finding the surface, the mechanism must re-label the data using the surface in order to train the classification algorithm according to the surface. The mechanism denotes the surface as S and it consists of set of nodes from the hierarchy $S=N_1, N_2, \ldots, N_m$, each $N_j$ is a node from either $level_l$ or $level_p$. The new label for each $x_i$ in $D_m$ is derived as $S \cap \{y_i^l, y_i^p\}$. The relabeled dataset is used to train a state-of-the-art classifier that learns to classify the input to a label at either $level_l$ or $level_p$ in T. The instances that are only labeled at $level_p$ by this classifier need to go through a secondary classification strategy in order to derive the label at $label_l$; however, the complexity of secondary classification task is drastically reduced as it is only required to select the correct label from a handful of options (one label from the children of selected label at $level_p$ as opposed to much larger space of all labels at $level_l$).

A hierarchical text classification task in the medical domain is selected to evaluate the proposed hierarchical classification with adaptive node collapses. The objective of the task is to assign a unique identifier from a standard dictionary for each adverse event identified in medical records. Such coding helps to eliminate the syntactic heterogeneity of the reported adverse events and standardize the output. The standard dictionary used for this task is called Medical Dictionary for Regulatory Activities (MedDRA), hence the task is commonly referred as MedDRA coding. The codes in the MedDRA dictionary are arranged in a tree with five levels and most specific level has 76,468 codes and its parent level has 22,210 codes. MedDRA coding task is challenging not only due to mere volume of the unique identifiers to select from, but also the fine-grained semantic differences between them; for example missed pills and drug dose omission are assigned with two unique codes as the latter event is intentional while former could be a genuine "forget" scenario. Typical distribution of MedDRA coded adverse events follow a very skewed distribution over the codes as only few events are very frequent and many events are relatively infrequent or very rare. Hence, MedDRA coding task poses great challenge to classification algorithms. Therefore, it is a good test bed to evaluate the proposed approach. The evaluation is focused on empirically evaluating the benefit of the proposed approach compared to traditional classification approaches. Specifically, consider the following questions in the evaluation:

1. What is the accuracy gain by the proposed approach?
2. What is the effort required to find the correct label at $level_l$ for instances labelled for $level_p$ by the proposed approach?
3. What are the characteristics of the moved labels by the approach?

The dataset consists of 501,818 pairs of (adverse event, MedDRA code at levell), few examples are (pain in arm, 10033421), (upper limbs pain, 10033421), (worsening arm pain, 10033421), and (blurring of eyes, 10005887). The dataset contains 5,728 unique codes and each code appears at least 10 times in the dataset. The skewness of this dataset according to Fisher-Pearson coefficient of skewness is 14.62 which entails a heavily skewed distribution. The dataset is split into 90:10 between training and testing splits. This results in 454,108 instances for training and 47,710 instances for testing. The splitting makes sure that every label has at least one instance in training and one instance in testing.

In order to demonstrate that the proposed algorithm finds the surface considering the characteristics of the dataset beyond other common strategies, the results of the generated surface am compared with three other baselines. The result obtained by the illustrative embodiment and the other baselines are compared with the Base Model, which does not move any node and classify all instances for nodes at $level_l$. The surface generated by the proposed algorithm is denoted as S. Assume S moved x number of nodes at $level_l$ to $level_p$. The performance is compared with:

1. $S_R$—Surface generated by randomly moving x nodes at level to $level_p$
2. $S_{LF}$—Surface generated by moving the least frequent x nodes at $level_l$ in the dataset to $level_p$
3. $S_{CW}$—Surface generated by moving x nodes at $level_l$ with least class-wise accuracy in the Base Model to $level_p$ The proposed neural network architecture has few hyperparameters. The network is initialized with kernel configuration of 2*128, 3*128, and 4*128 (i.e., 128 kernels of size 2). The input text is represented with 300-dimensional GloVe embeddings learned from the Medline corpus. The embeddings learn from the Medline corpus helped to increase the coverage of the vocabulary in the dataset and learn representation for words by capturing the domain semantics. We added a dropout layer on concatenation layer with 0.5 probability. The model is trained for 10 epochs with batches of size 512 using adam optimizer.

The convolution neural network is used to perform the classification task after identifying the surface. It is similar to the network presented here except that it does not have a surface layer and connects the concatenated layer to a single output softmax layer. The size of the output layer in this network is same as the number of nodes in the surface. This network is trained for 15 epochs with batches of size 256 using adam optimizer.

Figure 9:
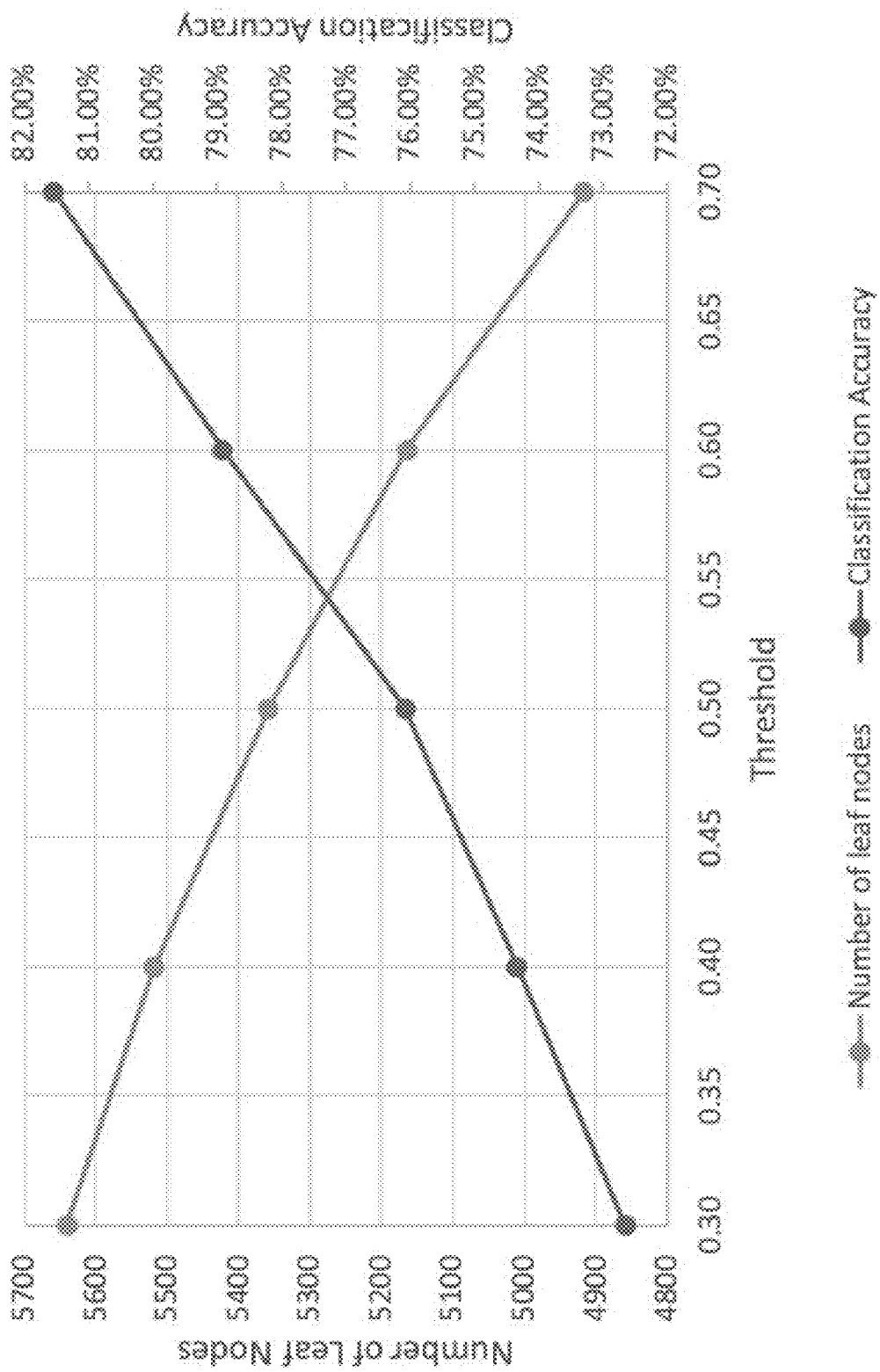
FIG. 9 shows the accuracy variation with the threshold in accordance with an illustrative embodiment.

The surface is derived based on a predefined threshold as shown above. The threshold values are set in order to select a surface to answer the evaluation questions. As the threshold is increased, the number of nodes at $level_l$ selected for surface decreases and their parents are added to the surface instead. Hence, the total number of labels in the classification problem and its complexity are reduced resulting in an increase of the classification accuracy. When the threshold value is decreased, the accuracy decreases as number of labels in the classification problem and its complexity increases. FIG. 9 shows the accuracy variation with the threshold in accordance with an illustrative embodiment. The selected surface is derived with threshold 0.5 as it represents the decision boundary for binary classification problems.

The classification results are obtained by the models trained on the re-labelled data according to the surfaces with the results obtained by the Base Model.

TABLE 1

| Model | # nodes at $level_l$ | # nodes at $level_p$ | Accuracy |
|---|---|---|---|
| Base Model | 5728 | 0 | 71.4% |
| S | 5226 | 370 | 76.08% |
| $S_R$ | 5226 | 370 | 72.11% |
| $S_{LF}$ | 5226 | 370 | 71.31% |
| $S_{CW}$ | 5226 | 370 | 71.76% |

Table 1 shows the comparison of classification results obtained for Base Model and surface models. The surface model S used for this experiment is generated by selecting 0.5 as the threshold. This surface selected 370 nodes at level to be moved to $level_p$ and we generated the $S_R$, $S_{LF}$, $S_{CW}$ accordingly. As shown in the table the surface outperforms the baseline surfaces. This proves the proposed algorithm is capable of identifying a better surface than random selection or selection based on the frequency or selection based on the class-wise accuracy. The accuracy values of the baseline surfaces lies within 0:8 window. The common expectation is that models generated with $S_{LF}$ and $S_{CW}$ would have noticeable accuracy gain since they are abstracting the labels that potentially lead to poor overall performance of the Base Model. However, if the abstracted labels do not have reasonable volume in the testing dataset or their abstraction does not help to reduce the ambiguity between the labels, the impact of the abstraction would not be reflected in the overall classification accuracy or it might negatively impact the classification accuracy. In fact, it is observed only 0.7% and 2.5% of the testing data points were relabeled to labels at $level_p$ as a result of $S_{LF}$ and $S_{CW}$ respectively. It is also observed a significant drop of class-wise accuracy for some labels that were not moved up in $S_{CW}$ compared to their classwise accuracy in the Base Model. This suggests that the moved nodes in $S_{CW}$ might have helped to identify the instances of these labels in the Base Model. These observations demonstrate the inadequacy of methods that derive the surface based on observable properties of a dataset.

The surface also outperforms the Base Model by >4.5% in terms of classification accuracy, but produce label at $level_p$ for a portion of test instances. Hence, two accuracy numbers are not comparable without further analysis of the trade-off between the accuracy gain and the loss of specificity in the labels.

21% of the predictions generated by classification model based on S have their predictions at $level_p$. In order to understand the value of the accuracy gain one must estimate the effort required to derive the label at $level_l$ for these instances. The advantage of the surface is that it simplifies the classification task for the instances that it cannot identify the correct label at $level_l$. For instance, if a particular test instance is incorrectly labeled at $level_l$, we are left with the task of finding the correct label for that instance from 5,727 labels whereas if this instance is labelled for the correct $parent_j$ we have to select from only the children of the $parent_j$. Hence, correct predictions at $level_p$ are desirable than incorrect predictions at $level_l$.

TABLE 2

| | Number of siblings | | | | |
|---|---|---|---|---|---|
| Model | 2 | 3 | 4 | 5 | >5 |
| Base Model | 0 | 0 | 6 | 0 | 0 |
| S | 49 | 26 | 9 | 5 | 15 |
| $S_R$ | 95 | 31 | 12 | 3 | 4 |
| $S_{LF}$ | 116 | 29 | 9 | 3 | 0 |
| $S_{CW}$ | 107 | 22 | 9 | 4 | 5 |

In order to understand the benefit of the correct labels at $level_p$ over incorrect labels at $level_l$, it is important to study the distribution of number of siblings moved with each label in each surface. Table 2 shows these statistics. The columns in the Table 2 represent the number of siblings moved to $level_p$ with each abstraction. According to Table 2, surface S moves 49 labels at $level_l$ along with one more sibling to $level_p$ (i.e., 98 labels (49*2) moved to $level_p$), and 26 labels at $level_l$ are moved to $level_p$ along with two more siblings (i.e., 78 labels (26*3) in total). As shown, S is able to identify reasonable number of the nodes with more siblings whereas significant majority of moved nodes in other surfaces are moved with only 1 or 2 siblings. Hence, those surfaces may not be able to reduce the complexity of the classification task compared to S.

If a particular prediction has label $parent_j$ and this node has only two children, then the subsequent classification task becomes a binary classification problem and if it has three children it needs to choose one from three options. The following metric is defined to estimate the reduction of classification complexity by labeling instances to abstracted labels, $$\text{classification complexity reduction} = \frac{\text{\# of }possibl\text{ labels post abstraction}}{\text{\# of possible labels prior to abstraction}} \quad (6)$$

The value range of this metric is between 0 and 1. When the number of labels to choose from is the same as the total number of labels, it has the value 1, i.e., the incorrect prediction at level has the maximum complexity. If the algorithm is able to reduce the number of possible labels, the metric has <1 value, i.e., the correct predictions at $level_p$ has less complexity. If a particular surface goes through the higher level nodes in T, the resulting classification task has less complexity reduction. The classifications at root node has the maximum complexity.

TABLE 3

| Model | Classification complexity reduction |
|---|---|
| Base Model | 1 |
| S | 0.001 |
| $S_R$ | 0.0005 |
| $S_{LF}$ | 0.0004 |
| $S_{CW}$ | 0.0004 |

In order to estimate the classification complexity reduction by S, the average classification complexity reduction is calculated for its all correct predictions at $level_p$. Table 3 shows the average classification complexity reduction values calculated for all surface models. In order to interpret this number with the accuracy gain, assume the scenario of improving the results of the Base Model to 76.08%. This requires labeling of 2,233 incorrect predictions of the Base Model with correct labels. The average classification complexity reduction of this task is 1 as each label has to be chosen from the total number of labels. However, the surface S has managed to achieve this accuracy by keeping the classification complexity of the remaining classification task of finding the correct label at $level_l$ at 1/1000 fraction compared to the Base Model. Hence, the accuracy gain obtained with S is associated with a much simpler relabeling task compared to the re-labeling of incorrect predictions of Base Model to achieve similar accuracy.

In order to further understand the behavior of the proposed algorithm, consider the features of the moved nodes in S.

First, consider the moved nodes with respect to their class-wise accuracy in the Base Model Sew demonstrated that merely moving the nodes in the tail of the class-wise accuracy distribution would not give an advantage. Table 4 shows how the moved nodes in S positioned in the class-wise accuracy distribution calculated using the results of the Base Model Once we arranged the labels in the Base Model according to the class-wise accuracy in decreasing order, 1.35% of the moved labels in S are within the last 10% of the this distribution and 16.48% are in last 20%. 87.56% of the moved labels in S are within the last 50% of the labels with the lowest accuracy. This shows that the vast majority of the moved nodes in S are in fact the ones which lead to poor performance in the Base Model.

TABLE 4

| Within last x % | Percent of Moved Nodes |
|---|---|
| 10 | 1.35% |
| 20 | 16.48% |
| 30 | 35.94% |
| 40 | 66.48% |
| 50 | 87.56% |

Figure 10:
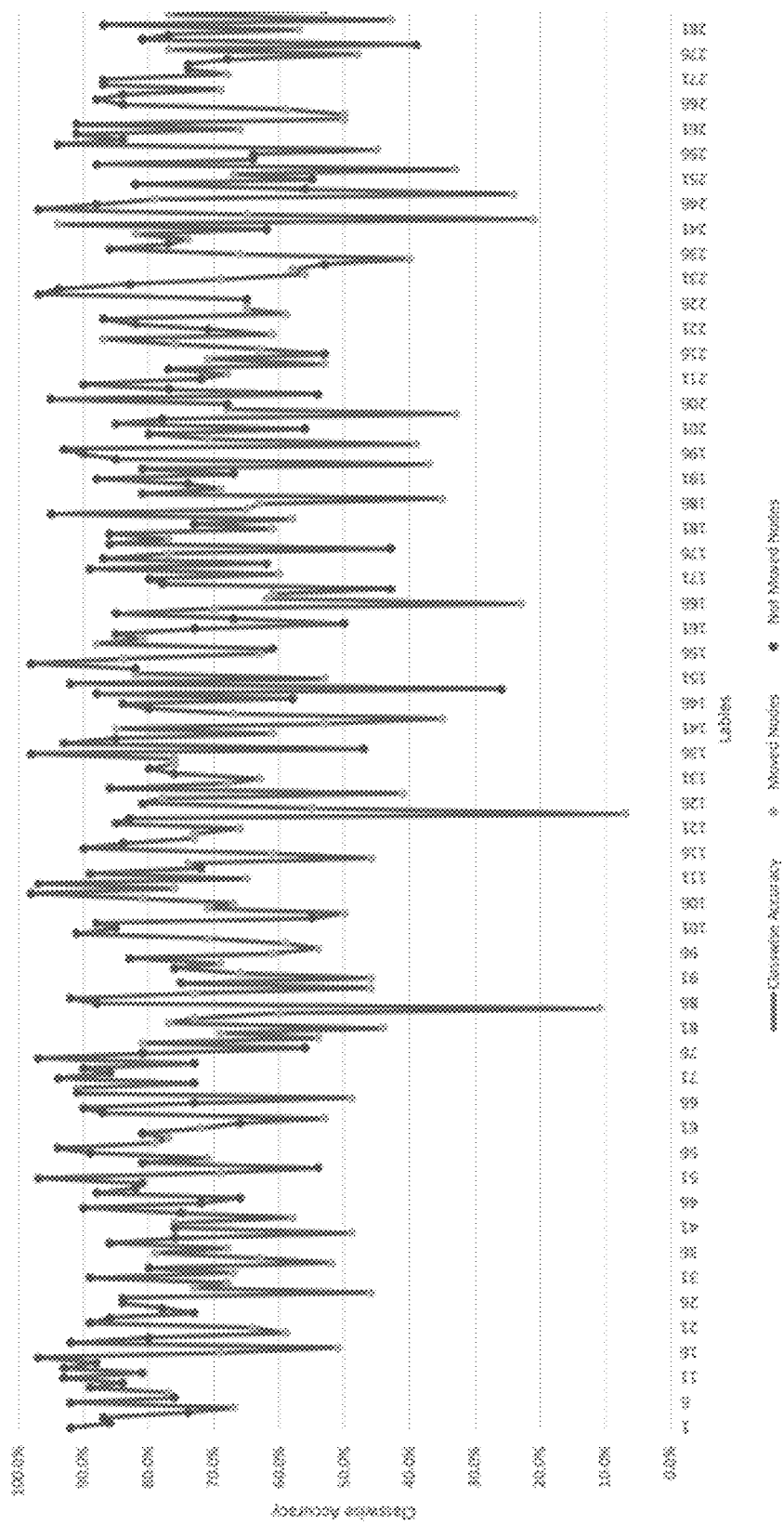
FIG. 10 shows the moved and not moved nodes within top 5% of the training data by volume with their class-wise accuracy in the Base Model.

Next, consider the moved nodes in S that have many training instances in the training dataset. FIG. 10 shows the moved and not moved nodes within top 5% of the training data by volume with their class-wise accuracy in the Base Model. As emphasized earlier, the mere presence of many instances in training data for a particular label does not guarantee a positive classification outcome for that label. As shown in FIG. 10, there are many labels with <50% accuracy within top 5% of the labels by volume. Hence, the surface should seek to include the parents of these labels instead of them if they can be classified with batter accuracy at the $level_p$. FIG. 10 shows that surface S was able to do this. The labels with high class-wise accuracy was not moved, but the labels with low class-wise accuracy was moved up regardless of their high volume. If we draw a horizontal line around the 70% accuracy mark in y-axis of this chart, the area above the line is dominated by the unmoved nodes and the area below the line is dominated by the moved nodes. This shows that the high-volume nodes moved up by S are indeed the nodes with low accuracy in the Base Model.

The proposed approach has a trade-off between the classification accuracy and the loss of specificity of the labels, and we demonstrated why the correct predictions at a $level_p$ is desirable over incorrect predictions at $level_l$ in such large scale classification problems. Furthermore, it may be possible to apply less complicated approaches like dictionary and/or rule-based or even learning solutions to derive the correct label for them at level after determining the correct label at $level_p$. The solution provided by the illustrative embodiment is most suitable for human-in-the-loop models because it is able to reduce the cognitive workload of the human by reducing the search space significantly. Such models are very common and desirable in the medical domain.

The surface found by our algorithm does not guarantee to be the best surface in the label hierarchy. There may exist a surface with more accuracy gain with less abstraction of labels. The best surface may be found using expensive methods such as exhaustive search and we have proposed a less expensive learning-based solution.

The illustrative embodiment limits the search space of the surface to the two most specific levels of T. This is desirable as the usability of the labels decreases as they become more abstract in the hierarchical classification problems. However, if more flexible surfaces are allowed, the illustrative embodiment can apply the proposed algorithm in an iterative manner, i.e., once we have the surface for two most specific levels, the mechanism of the illustrative embodiment may assume the subtree of the label tree that is created by the paths from root to nodes in the current surface at last but one level in the original hierarchy and apply the proposed algorithm. This would select the labels to be moved from the set of already moved libels by the previous iteration to the next abstract level. Such solution is preferred as opposed to finding the surface that is allowed to go over multiple levels in T at once, as such approach tend to move the surface to higher levels by being greedy to the possible accuracy gain.

The illustrative embodiment provides a solution to assess the feasibility of learning the labels of a classification task by optimizing the overall accuracy and effort require to correct the incorrect predictions. The above disclosure shows the effectiveness of the proposed mechanism in medical coding task and showed that it in fact identified the labels that might lead to incorrect predictions if not chosen to be abstracted. The abstraction of labels may consider as non-ideal output of an algorithm. However, this is acceptable in real-world applications when the overall goal of cognitive models is to assist the human experts to navigate through huge search spaces in their decision making process.

The future work include applying this strategy to multi-label classification problems and label hierarchies that may have more complex structures (e.g., graphs). Also, it is important to develop more meaningful evaluation strategies considering the overall benefit obtained by applying classification models in a real-world setting beyond its accuracy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 11 is a flowchart illustrating operation of a mechanism for training a model for optimizing hierarchical classification with adaptive node collapses in accordance with an illustrative embodiment. Operation begins (block 1100), and the mechanism receives a training data set and a labeling tree (block 1101). The mechanism trains a convolutional neural network to classify the training set to leaf nodes and parent nodes (block 1102). In accordance with the illustrative embodiment, the convolutional neural network has an indicative (sigmoid) layer for determining a surface through the labeling tree. The mechanism then trains the indicative layer, referred to herein as the surface layer, to find the surface through the labelling tree (block 1103). The mechanism relabels the data using the surface (block 1104). Then, the mechanism trains the classifier model for the cognitive system using the relabeled training data set (bock 1105). Thereafter, operation ends (block 1106).

FIG. 12 is a flowchart illustrating operation of a mechanism for training the surface layer of the model to find the surface through the hierarchical labeling tree in accordance with an illustrative embodiment. Operation begins (block 1200), and the mechanism considers each node in the leaf layer (bock 1202). The mechanism determines the loss function for the current node (block 1203). Then, the mechanism determines whether the loss value at the current leaf node is less than a predetermined threshold (block 1204).

If the loss value is greater than or equal to the threshold, then the mechanism adds the leaf node to the surface (block 1205). If the loss value is less than the threshold at block 1204, then the mechanism adds the parent of the leafnode to the surface (block 1206). Thereafter, the mechanism determines whether the current leaf node is the last node in the leaf layer (block 1207). If the node is not the last node in the leaf layer, then operation returns to block 1202 to consider the next node in the leaf layer. If the current node is the last node in the leaf layer in block 1207, then operation ends (block 1208).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a training system for finding an optimal surface for hierarchical classification on an ontology, the method comprising:

receiving, by the training system, a training data set and a hierarchical classification ontology data structure;

generating, by the training system, a neural network architecture based on the training data set and the hierarchical classification ontology data structure, wherein the neural network architecture comprises a surface layer, a parent tier (PT) output and a lower leaf tier (LLT) output, wherein the surface layer comprises, for each leaf node in a hierarchy of the hierarchical classification ontology data structure, a probability value that the leaf node is part of a surface that passes through each path, in the hierarchical ontology data structure, from a root node to a corresponding leaf node;

training, by the training system, the neural network architecture to classify the training data set to leaf nodes of the hierarchy at the LLT output, and parent nodes of the hierarchy at the PT output, wherein the training comprises, for each iteration of the training, increasing the probability value, in the surface layer, for one or more first leaf nodes, in response to the one or more first leaf nodes generating a correct label output in the LLT output, and decreasing the probability value, in the surface layer, for one or more second leaf nodes, in response to the one or more second leaf nodes generating an incorrect label output, wherein a final set of probability values is generated in the surface layer after training is completed;

determining, by the surface layer in the neural network architecture, a surface that passes through each path, from the root node to the corresponding leaf node, in the hierarchical ontology data structure based on the final set of probability values in the surface layer, wherein the surface comprises a set of nodes corresponding to classifications in the hierarchical classification ontology data structure; and training, by the training system, a classifier model for a cognitive system using the surface and the training data set.

2. The method of claim 1, wherein the neural network architecture comprises a convolutional neural network architecture.

3. The method of claim 1, wherein determining the surface comprises:

comparing the final probability value, in the surface layer, for each given node in the lower leaf tier, to a threshold;

adding the given node to the surface responsive to the final probability value being greater than or equal to the threshold; and adding a parent node of the given node to the surface responsive to the final probability value being less than the threshold.

4. The method of claim 1, wherein the training data set is a labeled training data set $D=\{(x_1, y_1^l), \ldots, (x_n, y_n^l)\}$, where $y_i^l$ is a leaf node in the hierarchy of the hierarchical classification ontology data structure, the method further comprising obtaining a parent of each $y_i^l$ and adding the parent as the second a label for each training instance to form a modified dataset $D_m=\{(x_1, y_1^l, y_1^p), \ldots, (x_n, y_n^l, y_n^p)\}$, where $y_i^p$ is the parent of $y_i^l$ according to the hierarchy of the hierarchical classification ontology data structure.

5. The method of claim 4, wherein a loss at a lower leaf tier $level_l$ and a loss at a parent tier $level_p$ are determined according to the following equations:

$$loss_{level_l} = -\sum_{i=1}^{n} y^{l_i} \log(\hat{y}^{l_i})$$

$$loss_{level_p} = -\sum_{i=1}^{m} y^{p_i} \log(\hat{y}^{p_i})$$

where $y^{l_i}$ is leaf node i and $y^{p_i}$ is a parent node of leaf node i, and where n and m are the number of nodes at $level_l$ and $level_p$ in the hierarchical classification ontology data structure, respectively, and wherein the probability values in the surface layer are based on the loss at the lower leaf tier and the loss at the parent tier for each corresponding leaf node in the hierarchical classification ontology data structure.

6. The method of claim 5, wherein a loss of the neural network is generated according to the following equation:

$$loss = loss_{level_l} + (1 - e^{loss_{level_l}^2})loss_{level_p} - \log(1 - |(p - e^{-loss_{level_l}^2})|),$$

wherein p is the probability a value in the surface layer corresponds to a relevant node at $level_l$.

7. The method of claim 1, wherein training the classifier model comprises relabeling the training data set based on the surface and one or more adaptive node collapses in the hierarchical classification ontology data structure.

8. The method of claim 1, wherein receiving the hierarchical classification ontology data structure comprises receiving a single level of labels and generating the hierarchical classification ontology data structure based on the single level of labels.

9. The method of claim 7, wherein relabeling the training data set based on the surface comprises generating a new label for each data element in the training data set based on an intersection of the surface with a set of leaf node labels and parent nodes labels.

10. A computer program product comprising a computer readable storage medium having a computer readable program stored therein, wherein the computer readable program, when executed on at least one processor of a computing device, causes the at least one processor to implement a training system for finding an optimal surface for hierarchical classification on an ontology, wherein the computer readable program causes the at least one processor to:

receive, by the training system, a training data set and a hierarchical classification ontology data structure;

generate, by the training system, a neural network architecture based on the training data set and the hierarchical classification ontology data structure, wherein the neural network architecture comprises a surface layer, a parent tier (PT) output and a lower leaf tier (LLT) output, wherein the surface layer comprises, for each leaf node in a hierarchy of the hierarchical classification ontology data structure, a probability value that the leaf node is part of a surface that passes through each path, in the hierarchical ontology data structure, from a root node to a corresponding leaf node;

train, by the training system, the neural network architecture to classify the training data set to leaf nodes of the hierarchy at the LLT output, and parent nodes of the hierarchy at the PT output, wherein the training comprises, for each iteration of the training, increasing the probability value, in the surface layer, for one or more first leaf nodes, in response to the one or more first leaf nodes generating a correct label output in the LLT output, and decreasing the probability value, in the surface layer, for one or more second leaf nodes, in response to the one or more second leaf nodes generating an incorrect label output, wherein a final set of probability values is generated in the surface layer after training is completed;

determine, by the surface layer in the neural network architecture, a surface that passes through each path from the root node to the corresponding leaf node, in the hierarchical ontology data structure based on the final set of probability values in the surface layer, wherein the surface comprises a set of nodes corresponding to classifications in the hierarchical classification ontology data structure; and train, by the training system, a classifier model for a cognitive system using the surface and the training data set.

11. The computer program product of claim 10, wherein the neural network architecture comprises a convolutional neural network architecture.

12. The computer program product of claim 10, wherein determining the surface comprises:
comparing the final probability value, in the surface layer, for each given node in the lower leaf tier, to a threshold;
adding the given node to the surface responsive to the final probability value being greater than or equal to the threshold; and
adding a parent node of the given node to the surface responsive to the final probability value being less than the threshold.

13. The computer program product of claim 10, wherein the training data set is a labeled training data set $D=\{(x_1, y_1^l), \ldots, (x_n, y_n^l)\}$, where $y_i^l$ is a leaf node in a hierarchy of the hierarchical classification ontology data structure, the method further comprising obtaining a parent of each $y_i^l$ and adding the parent as a label for each training instance to form a modified dataset $D_m=\{(x_1, y_1^l, y_1^p), \ldots, (x_n, y_n^l, y_n^p)\}$, where yip is the parent of $y_i^l$ according to the hierarchy of the hierarchical classification ontology data structure.

14. The computer program product of claim 13, wherein a loss at a lower leaf tier $level_l$ and the loss at a parent tier $level_p$ are determined according to the following equations:

$$\text{loss}_{level_l} = -\sum_{i=1}^{n} y^{l_i} \log(\hat{y}^{l_i})$$

$$\text{loss}_{level_p} = -\sum_{i=1}^{m} y^{p_i} \log(\hat{y}^{p_i})$$

where $y^{l_i}$ is leaf node i and $y^{p_i}$ is a parent node of leaf node i, and where n and m are the number of nodes at $level_l$ and $level_p$ in the hierarchical classification ontology data structure, respectively, and wherein the probability values in the surface layer are based on the loss at the lower leaf tier and the loss at the parent tier for each corresponding leaf node in the hierarchical classification ontology data structure.

15. The computer program product of claim 14, wherein a loss for the neural network is generated according to the following equation:

$$\text{loss} = \text{loss}_{level_l} + (1 - e^{loss^2_{level_l}})\text{loss}_{level_p} - \log(1 - |(p - e^{-loss^2_{level_l}})|),$$

wherein p is the probability a value in the surface layer corresponds to a relevant node at $level_l$.

16. The computer program product of claim 10, wherein training the classifier model comprises relabeling the training data set based on the surface and one or more adaptive node collapses in the hierarchical classification ontology data structure.

17. The computer program product of claim 16, wherein relabeling the training data set based on the surface comprises generating a new label for each data element in the training data set based on an intersection of the surface with a set of leaf node labels and parent nodes labels.

18. An apparatus comprising:
at least one processor; and
a memory coupled to the at least one processor, wherein the memory comprises instructions which, when executed by the at least one processor, cause the at least one processor to implement a training system for finding an optimal surface for hierarchical classification on an ontology, wherein the instructions cause the at least one processor to:
receive, by the training system, a training data set and a hierarchical classification ontology data structure;
generate, by the training system, a neural network architecture based on the training data set and the hierarchical classification ontology data structure, wherein the neural network architecture comprises a surface layer, a parent tier (PT) output and a lower leaf tier (LLT) output, wherein the surface layer comprises, for each leaf node in a hierarchy of the hierarchical classification ontology data structure, a probability value that the leaf node is part of a surface that passes through each path, in the hierarchical ontology data structure, from a root node to a corresponding leaf node;
train, by the training system, the neural network architecture to classify the training data set to leaf nodes of the hierarchy at the LLT output, and parent nodes of the hierarchy at the PT output, wherein the training comprises, for each iteration of the training, increasing the probability value, in the surface layer, for one or more first leaf nodes, in response to the one or more first leaf nodes generating a correct label output in the LLT output, and decreasing the probability value, in the surface layer, for one or more second leaf nodes, in response to the one or more second leaf nodes generating an incorrect label output, wherein a final set of probability values is generated in the surface layer after training is completed;
determine, by the surface layer in the neural network architecture, a surface that passes through each path from the root node to the corresponding leaf node, in the hierarchical ontology data structure based on the final set of probability values in the surface layer, wherein the surface comprises a set of nodes corresponding to classifications in the hierarchical classification ontology data structure; and
train, by the training system, a classifier model for a cognitive system using the surface and the training data set.

19. The apparatus of claim 18, wherein the neural network architecture comprises a convolutional neural network architecture.

20. The apparatus of claim 18, wherein determining the surface comprises:
comparing the final probability value, in the surface layer, for each given node in the lower leaf tier, to a threshold;
adding the given node to the surface responsive to the final probability value being greater than or equal to the threshold; and
adding a parent node of the given node to the surface responsive to the final probability value being less than the threshold.

21. The apparatus of claim 18, wherein the training data set is a labeled training data set $D=\{(x_1, y_1^l), \ldots, (x_n, y_n^l)\}$, where $y_i^l$ is a leaf node in the hierarchy of the hierarchical classification ontology data structure, the method further comprising obtaining a parent of each $y_i^l$ and adding the parent as a label for each training instance to form a modified dataset $D_m=\{(x_1, y_1^l, y_1^p), \ldots, (x_n, y_n^l, y_n^p)\}$, where $y_i^p$ is the parent of $y_i^l$ according to the hierarchy of the hierarchical classification ontology data structure.

22. The apparatus of claim 21, wherein a loss at a lower leaf tier $level_l$ and a loss at a parent tier $level_p$ are determined according to the following equations:

$$\text{loss}_{level_l} = -\sum_{i=1}^{n} y^{l_i} \log(\hat{y}^{l_i})$$

$$\text{loss}_{level_p} = -\sum_{i=1}^{m} y^{p_i} \log(\hat{y}^{p_i})$$

where $y^{l_i}$ is leaf node i and $y^{p_i}$ is a parent node of leaf node i, and where n and m are the number of nodes at $level_l$ and $level_p$ in the hierarchical classification ontology data structure, respectively, and wherein the probability values in the surface layer are based on the loss at the lower leaf tier and the loss at the parent tier for each corresponding leaf node in the hierarchical classification ontology data structure.

23. The apparatus of claim 22, wherein a loss for the neural network is generated according to the following equation:

$$\text{loss} = \text{loss}_{level_l} + (1 - e^{\text{loss}_{level_l}^2})\text{loss}_{level_p} - \log(1 - |(p - e^{-\text{loss}_{level_l}^2})|),$$

wherein p is the probability a value in the surface layer corresponds to a relevant node at $level_l$.

24. The apparatus of claim 18, wherein training the classifier model comprises relabeling the training data set based on the surface and one or more adaptive node collapses in the hierarchical classification ontology data structure.

25. The apparatus of claim 24, wherein relabeling the training data set based on the surface comprises generating a new label for each data element in the training data set based on an intersection of the surface with a set of leaf node labels and parent nodes labels.

* * * * *